United States Patent [19]

Achard et al.

[11] Patent Number: 4,529,768

[45] Date of Patent: Jul. 16, 1985

[54] SOLUTIONS BASED ON POLYVINYL CHLORIDE, THE PROCESS FOR THEIR PREPARATION AND YARNS AND FIBRES THUS OBTAINED

[75] Inventors: Georges Achard, Decines; Jacques Menault, Charbonnieres-les-Bains; Roger Thouvenot, Ligny-en-Barrois, all of France

[73] Assignee: Rhovyl, Neuilly-sur-Seine, France

[21] Appl. No.: 476,517

[22] Filed: Mar. 18, 1983

[30] Foreign Application Priority Data

Apr. 1, 1982 [FR] France ................. 82 05845

[51] Int. Cl.$^3$ ............................................... C08K 5/07
[52] U.S. Cl. ..................................... 524/365; 524/567
[58] Field of Search ............................. 524/567, 365

[56] References Cited

U.S. PATENT DOCUMENTS

| | | | |
|---|---|---|---|
| 2,161,766 | 6/1939 | Rugeley et al. | 524/365 |
| 2,418,507 | 4/1947 | Glenn | 524/365 |
| 2,481,294 | 9/1949 | Corbière et al. | 524/365 |
| 3,073,718 | 1/1963 | Lund | 524/365 |

*Primary Examiner*—Paul R. Michl
*Assistant Examiner*—N. Sarofim
*Attorney, Agent, or Firm*—Stevens, Davis, Miller & Mosher

[57] ABSTRACT

The present invention relates to new homogeneous solutions based on polyvinyl chloride, which can be shaped, the process for their preparation and the shaped articles obtained.

For a polymer concentration of 15 to 35%, the solutions have an effective viscosity of between 15 and 2,000 poises in a solvent medium which has, at ambient temperature, a solubility parameter of between 8 and 11 and a dielectric constant of between 5 and 25, and which gives, with polyvinyl chloride, a variation in effective viscosity with temperature, represented by a curve $d\rho/d\theta$, which passes through a maximum absolute value. They are obtained by heating a composition of polyvinyl chloride in the solvent medium to a temperature which is at least 25° C. higher than the average temperature corresponding to the maximum of the curve $d\rho/d\theta$.

The yarns and fibres obtained, which have good properties, can be used by themselves or in a blend for the production of woven fabrics, knitted fabrics, non-woven structures and the like.

4 Claims, No Drawings

SOLUTIONS BASED ON POLYVINYL CHLORIDE, THE PROCESS FOR THEIR PREPARATION AND YARNS AND FIBRES THUS OBTAINED

The present invention relates to new homogeneous solutions based on polyvinyl chloride, which can be shaped.

It also relates to the process for the preparation of these solutions, the yarns and fibres derived from these solutions and the process for the production of the said yarns and fibres.

The fibres based on polyvinyl chloride which have been known hitherto are valued in the textile field because of certain particular properties such as non-flammability, negative triboelectricity, resistance to light, chemical inertness and thermal, electrical and acoustic insulating power. However, ordinary polyvinyl chloride, which is predominantly atactic, by itself or mixed, for example with chlorinated polyvinyl chloride, presents processing difficulties in certain solvents or solvent mixtures, because of poor dispersibility and poor dissolution, leading to solutions of very large apparent viscosity (of the order of several thousand poises), which makes them difficult to spin and does not make it possible to obtain filaments of fine gauge and of good stretchability, either in terms of ratio or in terms of uniformity, and therefore has the consequence of limiting the use of such yarns and fibres.

Furthermore, there are very good solvents for polyvinyl chloride (dimethylformamide, dimethyl sulphoxide and the like) which lead to solutions of good viscosity, but the dry spinning of these solutions in high-boiling solvents requires the use of high temperatures, causing the degradation of the polyvinyl chloride.

It has now been found, surprisingly, that it is possible to prepare low-viscosity homogeneous solutions of polyvinyl chloride at relatively low spinning temperatures, which makes it possible to obtain filaments having very good characteristics and possessing a high degree of uniformity on one and the same strand and from one strand to the next.

The present Application relates more particularly to spinnable homogeneous solutions based on polyvinyl chloride such as defined below and having a polymer concentration of between 15 and 35%, preferably of between 22 and 32% by weight, the said polymer having a number-average molecular weight of between 50,000 and 120,000, preferably of between 60,000 and 90,000, and an effective viscosity of between 15 and 2,000 poises in a solvent medium which has, at ambient temperature, a solubility parameter S of between 8 and 11 and a dielectric constant of between 5 and 25, and which gives, with polyvinyl chloride, a variation in effective viscosity with temperature, represented by a curve $d\rho/d\theta$, which passes through a maximum absolute value.

The present invention also relates to a process for the preparation of the solutions defined above by heating a composition of polyvinyl chloride in the solvent medium defined above, having a concentration of between 15 and 35%, at a temperature which is at least 25° C. higher than the average temperature corresponding to the maximum of the curve $d\rho/d\theta$.

If the concentration is not too high, the solutions thus obtained can then be cooled to the use temperature, which can be as low as 60° C.

The present invention also relates to the filaments, yarns and fibres having a shrinkage force of at least $1.2 \cdot 10^{-2}$ g/dtex and a residual shrinkage in boiling water of less than 2%.

Finally, it relates to a process for the production of the filaments, yarns and fibres by dry spinning in a known manner, stretching in a ratio of at least 4×, stabilisation in an aqueous fluid medium at a temperature equal to at least 100° C., and shrinkage in an aqueous fluid medium at a temperature equal to or greater than 100° C.

The expression "polyvinyl chloride" used throughout the text is understood as meaning:

ordinary vinyl chloride homopolymer, which is predominantly atactic (that is to say obtained by hot polymerisation), having a number-average molecular weight $\overline{M}n$ of 50,000 to 120,000, preferably of 60,000 to 90,000, and a glass transition temperature Tg of 65° to 85° C., copolymers containing at least 85% by weight of vinyl chloride and up to 15% of a comonomer which can be polymerised with vinyl chloride, such as vinyl acetate, vinylic and (meth)acrylic esters and ethers, acrylonitrile, olefines such as ethylene, and the like, or mixtures of polyvinyl chloride, or of a vinyl chloride copolymer such as defined above, with another polymer in order to improve the characteristics of the articles obtained (for example dyeing affinity and heat resistance).

Amongst these polymers, there may be mentioned cellulose esters, cyanoethylated cellulose, polyvinyl alcohol modified by ester sites or cyanoethylated polyvinyl alcohol, and polyacrylonitrile, the polyvinyl chloride or vinyl chloride copolymer being present in a proportion of at least 75% in the mixture of polymers, but provided that the mixture of polymers obtained contains at least 75% by weight of vinyl chloride units and that the solutions thus prepared are homogeneous.

The solutions according to the present invention in fact possess the totally surprising characteristic of having a low effective viscosity of between 15 and 2,000 poises, preferably of between 50 and 1,000, at relatively low temperatures from about 60° C., which enables them to be used, in particular to be spun, at temperatures which are not too high, for example at temperatures which do not degrade the polymer.

In the text, the effective viscosity is measured in the following manner:

The solvent and the polymer, cooled beforehand to $-10°$ C., are mixed and homogenised for 1 minute with the aid of a turbine. The mixture is introduced rapidly into a stirred tank fitted with a piston at its end. This piston pushes the mixture at a determined rate Q through a dissolver-homogeniser of the static mixer type. The mixture is heated to 120° C. It is then cooled to $\theta_1$ and transferred into the viscometer at this temperature.

The viscometer consists of a tube of diameter 6 mm and length 10 m.

It is heated by a jacket to the temperature $\theta_1$. Two probes placed at the two ends make it possible to measure the pressure difference between the inlet and the outlet of the tube, $\Delta P$.

The pressure in the whole equipment is greater than 20 bars.

The effective viscosity $\eta_e$ is determined by the formula $$\eta_e = \frac{\eta \Delta P \cdot R^4}{8Q \cdot L}$$

R being the radius of the tube and L its length, and the measurements being carried out with a gradient of 2.07 s$^{-1}$ and at a temperature of 90° C.

The solutions according to the present invention are also characterised by their concentration of 15 to 35% by weight, preferably of 22 to 32%, in a solvent medium which is itself defined by a solubility parameter S of between 8 and 11, such as defined in the review "Encyclopedia of Polymer Science and Technology"—volume 10—page 241, and a dielectric constant of between 5 and 25, preferably of between 8 and 20, and which gives, with polyvinyl chloride, on increasing the temperature, a variation in the effective viscosity of the solution, represented by a curve $d\rho/d\theta$ which passes through a maximum absolute value.

Amongst the solvents which are particularly suitable for the preparation of the solutions according to the present Application, there may be mentioned acetone, carbon disulphide/acetone mixtures and the like.

Acetone has a solubility coefficient S of 9.76 (cal./cm$^3$)$^{\frac{1}{2}}$ and a dielectric constant of 17.7, and a 50/50 by volume mixture of carbon disulphide and acetone, used in the examples, has a solubility coefficient S of 9.34 (cal./cm$^3$)$^{\frac{1}{2}}$ and a dielectric constant of 10.5 (at 22° C. and 120 KHertz).

The solutions according to the invention are obtained by heating to a temperature which is at least 25° C. higher than the temperature corresponding to the maximum absolute value of the curve $d\rho/d\theta$. This maximum in fact corresponds to a very rapid drop in the effective viscosity, which suddenly decreases by several thousand poises to a value of between 15 and 2,000 poises over a temperature range of the order of 30° C. or even less.

Surprisingly, such solutions also have the advantage of retaining their level of effective viscosity of between 15 and 2,000 poises, preferably of between 50 and 1,000 poises, even when the temperature is lowered.

The change in the effective viscosity during cooling can be seen on the curve $d\rho/d\theta$; this curve rises slightly with decreasing temperature and does not have an extreme value.

Furthermore, the effective viscosity of the solutions according to the present Application depends on certain factors, in particular on the concentration of the said solutions; thus:

for high concentrations (for example of the order of at least 30%), the solutions will preferably be used at temperatures which are not too low, for example of at least 80° or 85° C., conversely, for the lowest concentrations, the use temperatures will preferably be below 55° C., and for moderate concentrations, of the order of 25 to 27%, the use temperatures will be, for example, of the order of 70° to 75° C.

Such solutions, which can be stored without the effective viscosity increasing significantly, are particularly valuable for the production of filaments, yarns and fibres possessing noteworthy properties:

a shrinkage force of at least 1.2·10$^{-2}$ g/dtex and a residual shrinkage in boiling water of less than 2%.

The shrinkage force of the filaments is measured by means of a retractometer: the samples of filaments of length 4 cm, assembled in the form of test pieces having an average gauge of 400 dtex, with a pretension of 1.7·10$^{-2}$ g/dtex (each experiment being carried out on two test pieces), are subjected to a temperature increase of 1° C. per minute, from 30° C. to 170° C., after each of the various steps of stretching, stabilisation and, finally, shrinkage. The shrinkage force, expressed in 10$^{-2}$ g/dtex, is measured on each test piece as a function of the temperature. In each case, this shrinkage force passes through a maximum at a certain temperature. It is this maximum shrinkage force which represents the molecular orientation characteristics of the products, and it is designated simply by shrinkage force.

After the last stage of the process, namely the free shrinkage in an aqueous fluid, the yarns and fibres according to the present invention have a shrinkage force of at least 1.2·10$^{-2}$ g/dtex, generally of at least 1.7·10$^{-2}$ g/dtex, depending on the subsequent treatment to which the filaments are subjected.

The residual shrinkage in boiling water is generally measured after all the treatments on the yarns, in particular after the free shrinkage treatment in an aqueous fluid.

Moreover, the yarns and fibres according to the present invention have a good tenacity, generally of more than 22 g/tex, preferably of at least 25 g/tex, and a non-excessive elongation of less than 70%, preferably of less than 60%, which is totally remarkable for filaments based on ordinary polyvinyl chloride.

The characteristics of the yarns and fibres obtained are at least equivalent to those of fibres based on polyvinyl chloride/chlorinated polyvinyl chloride mixtures such as described in French Pat. No. 1,359,178 and its Addition No. 85,126. Their characteristics are even easily equivalent to those of fibres based on polyvinyl chloride/chlorinated polyvinyl chloride mixtures set in the presence of pressurised steam, such as described in French Application No. 80/26,047.

Furthermore, a better homogeneity of the solutions according to the present Application makes it possible to obtain a greater spinning speed, probably due to a better dissolution of the polymer.

The increase in throughput at the spinneret is of the order of 300%.

Furthermore, it is also possible to obtain fibres of finer gauge, which can fall to 1.5 or 1.3 dtex per strand, whereas with the processes known hitherto, it was not possible, under the best conditions, to obtain gauges of less than 2.5 dtex per strand.

The filaments and fibres according to the present invention are obtained by dry spinning (by any known process) of the solutions described above, it being possible for the temperature of the spinneret to be lower than in customary dry spinning, and the said filaments are then stretched, in order to impart a molecular orientation thereto and to improve their mechanical characteristics, in a ratio of at least 4×, preferably at least 6× and capable of reaching up to 9× or even more.

The stretching can be carried out in one or two stages, preferably in aqueous baths at increasing temperature, it being possible for the last bath to be at a temperature equal to or greater than the boiling point.

The filaments can also be preheated before stretching, for example in water at temperatures of between 60° and 100° C., preferably of between 75° and 85° C. The prestretching can be carried out in a bath of water at a temperature of between 70° and 95° C., and the second stretching can then be carried out at a higher temperature, for example at between 85° and 105° C.; if appropriate, the stretching baths can be equipped with a tube through which the filaments pass.

The filaments stretched in this way are then subjected to continuous stabilisation under tension in order to prevent any shrinkage, for example in a bath of boiling water for several seconds, generally at least 5 seconds, or, preferably, in the presence of pressurised steam at a temperature of between 105° and 130° C., preferably of between 110° and 120° C., for 1 to 3 seconds.

After stabilisation, they are preferably subjected continuously to free shrinkage, which can be carried out in boiling water for a variable period of time, for example at least 10 minutes, in general 10 to 20 minutes or even longer, or in saturated steam, for example by passage through a nozzle such as that described in French Pat. No. 83,329/1,289,491. In a nozzle of this type, the filaments are treated with saturated steam at a temperature of between 110° and 130° and are simultaneously shrunk and crimped, which permits a better subsequent textile workability.

In the case where the shrinkage is carried out in boiling water, this is preferably preceded by mechanical crimping by any known process, also for the purpose of facilitating the subsequent workability.

The whole of the process according to the present invention can be carried out continuously from the stretching onwards, or even from the dissolution of the polymers onwards, up to the production of the final yarns or fibres. Thus, it is easy to carry out economically on an industrial scale.

The dissolved polymers spun according to the present Application can contain customary additives such as light stabilisers, heat stabilisers, fluorescent brighteners, pigments, dyestuffs capable of improving some of their properties, such as their colour, the dyeing affinity, the heat stability and light stability, the electrical resistivity, and the like.

In the examples below, the tenacity and elongation measurements are carried out by means of an instrument known commercially under the trademark "INSTRON", by measuring the maximum force which a sample can withstand, relative to its gauge, this force being measured at constant elongation gradient.

The filaments, yarns and fibres obtained according to the present Application are used, by themselves or in a blend or in association with other textiles, for the production of woven fabrics, knitted fabrics and nonwoven structures employed in clothing, furnishing and the production of textile articles for industrial use.

The examples which follow, in which the parts are understood to be by weight, are given by way of indication but without implying a limitation.

EXAMPLE 1

In a disperser at a temperature of −5° C., ordinary polyvinyl chloride having a chlorine content of 56.5%, a number-average molecular weight of about 54,000 and an AFNOR index of 120, and containing 3 parts per 1,000, relative to the polymer, of a mixture of dioctyl-tin and monooctyl-tin thioglycolates, is mixed with a solvent mixture of acetone and carbon disulphide in proportions of 50/50 by volume, so as to give a polymer concentration of 30% by weight at ambient temperature. Effective viscosity: at least 10,000 poises. The mixture thus obtained is sent through a heat exchanger, where it is heated at 120° C. for 10 minutes.

The solution prepared in this way, having an effective viscosity of 400 poises, is filtered and then spun at 85° C. through a spinneret of diameter 156 mm, possessing 908 orifices each of diameter 0.06 mm, where the solvent mixture is evaporated off (by a process described in French Pat. No. 913,927). At the outlet of the spinneret, the filaments have a gauge per strand of 7 dtex.

The filaments subsequently pass through a bath of water kept at 85° C., where they are preheated for 10 seconds, then stretched a first time in a ratio of 3.5× in a bath of water kept at 91° C., and then a second time in a ratio of 2.28× in a bath of water under pressure at 103° C., so as to give an overall stretching ratio of 8×.

The filaments stretched in this way are subsequently subjected to setting under tension in a bath of boiling water for 10 seconds, and then to free shrinkage in boiling water for 20 minutes.

The fibres thus obtained possess the following characteristics:

| | |
|---|---|
| gauge - dtex | 1.5 |
| tenacity - g/tex | 22.2 |
| elongation - % | 68 |
| residual shrinkage in boiling water - % | <1 |
| shrinkage force - g/dtex | $1.2 \cdot 10^{-2}$ |

EXAMPLE 2

Comparative experiment

A solution of predominantly atactic polyvinyl chloride (AFNOR index 120—chlorine content: 56.5%) in a 50/50 by volume solvent mixture of carbon disulphide and acetone, having a polymer concentration of 28%, is prepared by stirring for 7 hours at ambient temperature. The solution is spun while being kept at 70° C. and while having an effective viscosity of 10,000 poises. The spinning is carried out through a spinneret of diameter 156 mm, possessing 908 orifices each of diameter 0.06 mm, in a dry spinning cell having a wall temperature of 88° C., enabling the solvent mixture to be recovered continuously.

The filaments, having a gauge per strand of 7 dtex, are preheated in a bath of water kept at 80° C., then stretched in a bath of water kept at 81° C., in a ratio of 3.50×, and then stretched again in a bath of water at 98° C., in a ratio of 1.35×, so as to give a total stretching of 4.45×.

The filaments are then stabilised in a bath of boiling water at 98° C. under tension for 10 seconds, before being shrunk, also in a bath of boiling water, for 10 minutes.

The filaments thus obtained possess the following characteristics:

| | |
|---|---|
| gauge - dtex | 2.6 |
| tenacity - g/tex | 17.5 |
| elongation - % | 94 |
| residual shrinkage in boiling water - % | <2 |
| shrinkage force - g/dtex | $0.7 \cdot 10^{-2}$ |

EXAMPLE 3

Example 1 is repeated, but instead of being stabilised in boiling water at 100° C. the filaments are set under tension by passage through a tube at a temperature of 120° for 2 seconds, in the presence of pressurised steam, before being shrunk in boiling water for 20 minutes.

The filaments obtained possess the following characteristics:

| | |
|---|---|
| gauge per strand at spinneret outlet - dtex | 7 |
| gauge - dtex | 1.3 |
| tenacity - g/tex | 25.3 |
| elongation | 53 |
| residual shrinkage in boiling water - % | <2 |
| shrinkage force - g/dtex | $1.85 \cdot 10^{-2}$ |

EXAMPLE 4

Comparative experiment

Example 2 is repeated, but instead of being stabilised in boiling water, the filaments are set under tension by passage through a tube at a temperature of 120° C. for 2 seconds, in the presence of pressurised steam, before being shrunk in boiling water for 20 minutes.

The filaments obtained possess the following characteristics:

| | |
|---|---|
| gauge per strand at spinneret outlet - dtex | 7 |
| final gauge - dtex | 2.5 |
| tenacity - g/tex | 21.4 |
| elongation - % | 75 |
| shrinkage force - g/dtex | $1.1 \cdot 10^{-2}$ |

Experiments 1 to 4 are carried out with identical gauges per strand at the outlet of the spinneret (7 dtex).

EXAMPLE 5

Examples 5 to 8 are carried out with identical gauges per strand of the finished yarns.

Example 1 is repeated as regards the preparation of the solution, which, after heating to 120° C., has an effective viscosity of 400 poises.

The solution is spun through a spinneret having orifices of diameter 0.07 mm, and the filaments are then treated under the conditions of Example 1.

They possess the following characteristics:

| | |
|---|---|
| gauge per strand at spinneret outlet - dtex | 15 |
| gauge per strand of finished fibre - dtex | 3.3 |
| elongation - % | 67 |
| tenacity - g/tex | 22.5 |
| shrinkage force - g/dtex | $1.7 \cdot 10^{-2}$ |

EXAMPLE 6

Comparative experiment

Example 2 is repeated, the feed rate at the spinneret being modified so that, at the outlet of the spinneret, the filaments have a gauge per strand of 9 dtex. The filaments are then treated under the conditions indicated in Example 2.

They possess the following characteristics:

| | |
|---|---|
| gauge per strand at spinneret outlet - dtex | 9 |
| final gauge per strand - dtex | 3.3 |
| tenacity - g/tex | 18 |
| elongation - % | 92 |
| shrinkage force - g/dtex | $0.85 \cdot 10^{-2}$ |

EXAMPLE 7

Example 3 is repeated, the feed rate at the spinneret being modified so that, at the outlet of the spinneret, the filaments have a gauge per strand of 18 dtex, and a spinneret having orifices of diameter 0.07 mm being used.

The filaments are then treated under the conditions given in Example 3, except for the 2nd stretching, in which the ratio is 2.31×, the overall stretching ratio being 8.1×.

They possess the following characteristics:

| | |
|---|---|
| gauge per strand at spinneret outlet - dtex | 18 |
| gauge per strand of finished fibre - dtex | 3.3 |
| tenacity - g/tex | 25 |
| elongation - % | 54 |
| shrinkage force - g/dtex | $2.1 \cdot 10^{-2}$ |
| residual shrinkage in boiling water - % | <2 |

EXAMPLE 8

Comparative experiment

Example 4 is repeated, the throughput of the solution at the spinneret being adjusted so as to give filaments having a gauge per strand, at the outlet of the spinneret, of 10 dtex. The filaments are then treated according to Example 4.

They possess the following characteristics:

| | |
|---|---|
| gauge per strand at spinneret outlet - dtex | 10 |
| gauge per strand of finished fibre - dtex | 3.3 |
| elongation - % | 72 |
| tenacity - g/tex | 21.3 |
| shrinkage force - g/dtex | $1.10 \cdot 10^{-2}$ |

A stretching ratio of 4.45× is considered to be the maximum stretching ratio which can be achieved industrially, that is to say without obtaining unstretched broken strands, that is to say less than 2/1,000 g in the case of spinning carried out hitherto, and that is to say with polymer/solvent mixtures not heated according to the invention and with a setting treatment of the filaments in boiling water.

Thus, this process does not make it possible to obtain gauges per strand of 1.5 dtex with the maximum ratio of 4.45×.

EXAMPLES 9 to 11

Examples 9 and 10, according to the invention, are carried out in order to obtain a fine gauge of the finished fibre (1.5 dtex).

These Examples are carried out under the conditions of example 3, the feed rates of solutions at the spinneret being adjusted, and the filaments then being set under tension in pressurised steam at 120° C. for 2 seconds.

Comparative Example 11 is carried out in order to obtain fibres of the smallest possible gauge under the conditions described in Example 4.

The table below summarises the characteristics obtained:

| | Example 9 according to the invention | Example 10 | Example 11 comparative |
|---|---|---|---|
| gauge per strand at spinneret outlet - dtex | 7.5 | 8.3 | 5.2 |
| stretching ratio - X | 8.0 | 8.0 | 4.45 |
| gauge per strand of finished fibre - dtex | 1.5 | 1.5 | 2 |
| tenacity - g/tex | 25.4 | 26.4 | 21.5 |

-continued

|  | Example 9 according to the invention | Example 10 | Example 11 comparative |
|---|---|---|---|
| elongation - % | 55.4 | 55.3 | 72 |
| shrinkage force - g/dtex | $2.10^{-2}$ | $2.1 \cdot 10^{-2}$ | $1.1 \cdot 10^{-2}$ |
| residual shrinkage in boiling water - % | <2 | <2 | <2 |

EXAMPLE 12

In a disperser, ordinary polyvinyl chloride having a chlorine content of 56.5%, a number-average molecular weight of about 54,000 and an AFNOR index of 120, and containing 3 parts per 1,000, relative to the polymer, of a mixture of dioctyl-tin and monooctyl-tin thioglycolates, is mixed with pure acetone so as to give a polymer concentration of 29% by weight at ambient temperature—effective viscosity greater than 10,000. The mixture thus obtained is sent through a heat exchanger, where it is heated at 120° C. for 20 minutes, and then cooled to 80° C.

The solution prepared in this way, having an effective viscosity of 280 poises, is filtered and then spun through a spinneret having 80 orifices of diameter 0.07 mm, where the solvent is evaporated off.

The filaments thus obtained are subsequently stretched in a bath of boiling water, in a ratio of 7.1×, and then set under tension for 2 seconds in the presence of pressurised steam and shrunk freely in a bath of boiling water for 20 minutes.

The filaments obtained possess the following characteristics:

| | |
|---|---|
| gauge per strand after spinning - dtex | 16 |
| gauge per strand of finished fibre - dtex | 3.3 |
| tenacity - g/tex | 23.5 |
| elongation - % | 61 |
| residual shrinkage in boiling water - % | <1 |
| shrinkage force - g/dtex | $1.9 \cdot 10^{-2}$ |

EXAMPLE 13

Pure acetone and cellulose acetate having an acetic acid level of 54.8% are introduced into a stirred vessel, and polyvinyl chloride such as described in Example 1 is added after 30 minutes. This gives a suspension, which is heated continuously at 120° C. and cooled to 90° C. and then spun through a spinneret having 80 orifices of diameter 0.07 mm.

The filaments are stretched only once in a bath of boiling water, in a ratio of 7.2×, and then set in a tube in the presence of pressurised steam at 120° C. for 2 seconds and shrunk in boiling water for 20 minutes.

The filaments obtained possess the following characteristics:

| | |
|---|---|
| gauge per strand at spinneret outlet - dtex | 17 |
| gauge per strand of finished fibre - dtex | 3.7 |
| tenacity - g/tex | 22 |
| elongation - % | 70 |
| shrinkage force - g/dtex | $1.6 \cdot 10^{-2}$ |
| residual shrinkage in boiling water - % | <1 |
| residual shrinkage in the presence of steam at 130° C. - % | <5 |

What is claimed is:

1. An improved homogeneous solution based on polyvinyl chloride which can be shaped, the said polyvinyl chloride having a number-average molecular weight of between 50,000 and 120,000 in a solvent medium which has, at ambient temperature, a solubility parameter S of between 8 and 11 and a dielectric constant of between 5 and 25, characterized in that the solution has a polyvinyl chloride concentration of between 15 and 35% by weight, an effective viscosity of between 15 and 2,000 poises, and that the solvent medium gives, with polyvinyl chloride, a variation in effective viscosity with temperature, represented by a curve $d\rho/d\theta$, which passes through a maximum absolute value.

2. A solution according to claim 1, characterized in that the effective viscosity is between 50 and 1,000 poises.

3. A solution according to claim 1, characterized in that the solvent medium used is chosen from amongst acetone and carbon disulphide/acetone mixtures.

4. A process for the preparation of a solution based on polyvinyl chloride according to claim 1, having a concentration of 15 to 35% by weight in a solvent medium which has a solubility parameter S of between 8 and 11 and a dielectric coefficient of between 5 and 25, and which gives, with polyvinyl chloride, a variation in effective viscosity with temperature, $d\rho/d\theta$, which passes through a maximum absolute value, and further characterized in that the solution is heated to a temperature which is at least 25° C. higher than the temperature corresponding to the said maximum, and thereafter is cooled to a temperature which may be as low as 60° C.

* * * * *